(12) United States Patent
Gollapinni et al.

(10) Patent No.: US 12,130,775 B2
(45) Date of Patent: *Oct. 29, 2024

(54) FEDERATED COMPLIANCE MAPPING OF DISPARATE CONTENT MANAGEMENT SYSTEMS

(71) Applicant: OPEN TEXT HOLDINGS, INC., Menlo Park, CA (US)

(72) Inventors: Sunil Kumar Gollapinni, Bangalore (IN); David Humby, Richmond (CA); Lokesh Kumar Nayak, Mahasamund (IN); Mohammad Sameer Pathan, Bangalore (IN); Kancharla Anil Kumar, Bangalore (IN); Syed Nasir Bellary, Bangalore (IN)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,859

(22) Filed: Oct. 31, 2022

(65) Prior Publication Data
US 2023/0139493 A1   May 4, 2023

Related U.S. Application Data

(63) Continuation of application No. 17/977,796, filed on Oct. 31, 2022.
(Continued)

(51) Int. Cl.
*G06F 16/25* (2019.01)
*G06F 16/11* (2019.01)
(Continued)

(52) U.S. Cl.
CPC .......... *G06F 16/125* (2019.01); *G06F 16/185* (2019.01); *G06F 16/256* (2019.01); *G06Q 30/018* (2013.01)

(58) Field of Classification Search
CPC ..... G06F 16/125; G06F 16/256; G06F 16/185
See application file for complete search history.

(56) References Cited

U.S. PATENT DOCUMENTS

2021/0014282 A1*  1/2021  Anctil ................ H04L 63/205
2023/0133078 A1   5/2023  Gollapini et al.

* cited by examiner

Primary Examiner — Baoquoc N To
(74) Attorney, Agent, or Firm — Sprinkle IP Law Group

(57) ABSTRACT

A federated compliance management system operating in a cloud computing environment imports a repository-specific retention policy from a source information system operating in an enterprise computing environment and converts, using a policy mapping definition, the repository-specific retention policy into a federated retention policy. The policy mapping definition contains attribute mappings for federated attributes common across a plurality of information systems of disparate types, repository-specific attributes that are specific to an information system, and, where applicable, phase-common attributes that are common for all phases of an information system as well as phase-repository-specific attributes that are configured for a specific phase. The federated retention policy is stored in the cloud computing environment for use by the federated compliance management system, for instance, as a base policy for creating a repository-specific retention policy for a target system.

17 Claims, 26 Drawing Sheets

Related U.S. Application Data

(60) Provisional application No. 63/273,776, filed on Oct. 29, 2021.

(51) Int. Cl.
*G06F 16/185* (2019.01)
*G06Q 30/018* (2023.01)

```
"name": "cms_policy_mapping_definition",
"type": "POLICY",
"repositoryType": "CMS",
"mappingVersion": 8,
"attributeDefinition": {
        "minPhases": 1,
        "maxPhases": 1,
        "policyCommon": {
                "conditions": [
                        {
                                "id": "1f646ac5-61f2-41cd-a40c-625d81777bb0",
                                "attribute": "enabled",
                                "values": [
                                        false
                                ]
                        }
                ],
                "attributes": [
                        {
                                "name": "title",
                                "label": "l10n.policyCommon.attributes.title",
                                "type": "string",
                                "size": 256,
                                "order": 0,
                                "mandatory": true,
                                "updateable": true,
                                "customField": false,
                                "dropList": false,
                                "createScreen": true,
                                "updateScreen": true,
                                "multiValue": false,
                                "templateField": [
                                        {
                                                "provider": "      ",
                                                "field": "data.title"
                                        }
                                ]
                        },
                        {
                                "name": "description",
                                "label": "l10n.policyCommon.attributes.description",
                                "type": "string",
                                "size": 256,
                                "order": 1,
                                "mandatory": false,
                                "updateable": true,
                                "customField": false,
                                "dropList": false,
                                "createScreen": true,
                                "updateScreen": true,
                                "multiValue": false,
```

FIG. 4A

```
        "templateField": [
            {
                "provider": "    ",
                "field": "data.disabledComment"
            }
        ]
    },
    {
        "name": "disabledDate",
        "label": "l10n.policyCommon.attributes.disabledDate",
        "type": "date",
        "order": 6,
        "mandatory": false,
        "updateable": true,
        "customField": false,
        "dropList": false,
        "createScreen": true,
        "updateScreen": true,
        "multiValue": false,
        "condition": [
            "1f646ac5-61f2-41cd-a40c-625d81777bb0"
        ],
        "templateField": [
            {
                "provider": "    ",
                "field": "data.disabledDate"
            }
        ]
    },
    {
        "name": "delayEnforcement",
        "label": "l10n.policyCommon.attributes.delayEnforcement",
        "type": "integer",
        "order": 9,
        "default": 0,
        "minValue": 0,
        "maxValue": 48,
        "mandatory": false,
```

FIG. 4B

```
{
    "name": "disabledDate",
    "label": "l10n.policyCommon.attributes.disabledDate",
    "type": "date",
    "order": 6,
    "mandatory": false,
    "updateable": true,
    "customField": false,
    "dropList": false,
    "createScreen": true,
    "updateScreen": true,
    "multiValue": false,
    "condition": [
            "1f646ac5-61f2-41cd-a40c-625d81777bb0"
    ],
    "templateField": [
        {
            "provider": "    ",
            "field": "data.disabledDate"
        }
    ]
},
{
    "name": "delayEnforcement",
    "label": "l10n.policyCommon.attributes.delayEnforcement",
    "type": "integer",
    "order": 9,
    "default": 0,
    "minValue": 0,
    "maxValue": 48,
    "mandatory": false,
    "updateable": true,
    "customField": false,
    "dropList": false,
    "createScreen": true,
    "updateScreen": true,
    "multiValue": false,
    "templateField": [
```

FIG. 4C

```
"name": "dctm_policy_mapping_definition",
"repositoryType": "DCTM"
"type": " POLICY",
"mappingVersion": 13,
"attributeDefinition": {
        "minPhases": 2,
        "maxPhases": 7,
        "policyCommon": {
                "groups": [
                        {
                                "name": "policysettings",
                                "label": "l10n.policyCommon.groups.policysettings",
                                "order": 2
                        },
                        {
                                "name": "policyrules",
                                "label": "l10n.policyCommon.groups.policyrules",
                                "order": 3
                        },
                        {
                                "name": "vdmsnapshotretention",
                                "label": "l10n.policyCommon.groups.vdmsnapshotretention",
                                "order": 4
                        }
                ],
                "conditions": [
                        {
                                "id": "1f646ac5-61f2-41cd-a40c-625d81777bb0",
                                "attribute": "enabled",
                                "values": [
                                        false
                                ]
                        }
                ],
                "attributes": [
                        {
                                "name": "title",
                                "label": "l10n.policyCommon.attributes.title",
                                "group": null,
                                "customField": false,
                                "type": "string",
                                "size": 255,
                                "dropList": false,
                                "order": 0,
                                "updateable": false,
                                "mandatory": true,
                                "createScreen": true,
                                "updateScreen": true,
                                "templateField": [
```

FIG. 5A

```
{
    "name": "retentionstrategy",
    "label": "l10n.policyCommon.attributes.retentionstrategy",
    "group": "policysettings",
    "customField": true,
    "type": "string",
    "size": 50,
    "dropList": true,
    "repoDropListName": "retention-strategies",
    "dropListValues": [
        {
            "label": "l10n.policyCommon.attributes.retentionstrategy.droplist.individual",
            "value": "1"
        },
        {
            "label": "l10n.policyCommon.attributes.retentionstrategy.droplist.linked",
            "value": "0"
        }
    ],
    "multiValue": false,
    "order": 5,
    "updateable": false,
    "mandatory": true,
    "createScreen": true,
    "updateScreen": true,
    "repositoryField": "properties.retention_strategy_id",
    "templateField": [
        {
            "provider": "    ",
            "field": "data.dctm.retentionStrategy"
        }
    ]
},
```

FIG. 5B

```
{
        "name": "retentionstrategy",
        "label": "l10n.policyCommon.attributes.retentionstrategy",
        "group": "policysettings",
        "customField": true,
        "type": "string",
        "size": 50,
        "dropList": true,
        "repoDropListName": "retention-strategies",
        "dropListValues": [
                {
                        "label": "l10n.policyCommon.attributes.retentionstrategy.droplist.individual",
                        "value": "1"
                },
                {
                        "label": "l10n.policyCommon.attributes.retentionstrategy.droplist.linked",
                        "value": "0"
                }
        ],
        "multiValue": false,
        "order": 5,
        "updateable": false,
        "mandatory": true,
        "createScreen": true,
        "updateScreen": true,
        "repositoryField": "properties.retention_strategy_id",
        "templateField": [
                {
                        "provider": "        ",
                        "field": "data.dctm.retentionStrategy"
                }
        ]
},
{
        "name": "structuralretentiontype",
        "label": "l10n.policyCommon.attributes.structuralretentiontype",
        "group": "policysettings",
        "customField": true,
        "type": "boolean",
        "dropList": false,
        "order": 6,
        "updateable": false,
        "mandatory": true,
        "createScreen": true,
        "updateScreen": true,
        "repositoryField": "properties.is_linked_structural",
```

FIG. 5C

```
"provider": "    ",
"name": "Benefits Enrollment and Distribution - Employee Specific",
"type": "RETENTION",
"repositoryType": [
        "CMS",
        "CS",
        "DCTM",
        "IA"
],
"version": 1,
"data": {
        "title": "Benefits Enrollment and Distribution - Employee Specific",
        "description": "Any recorded information related to participation in company-sponsored benefit plans. Includes
health and life insurance, pension, 401K, disability, medical, vacation and sick benefits, leave of absence
plans,  educational assistance,  savings plans and payroll direct deposit elections. ",
        "enabled": true,
        "mandate": "26 C.F.R. § 1.408-2",
        "scopeNotes": " ",
        "disabledDate": null,
        "disabledComment": null,
        "cms": {
                "delayEnforcement": 7,
                "phases": [
                        {
                                "phaseNumber": 0,
                                "phaseName": "Phase 1",
                                "dispositionActionCode": "Destroy",
                                "retentionTriggerCode": "Calculated Date",
                                "retentionYears": 5,
                                "retentionMonths": 0,
                                "retentionDays": 0,
                                "retentionIntervals": null,
                                "yearEndDay": 1,
                                "yearEndMonth": 1,
                                "fixedDate": "2021-10-21T06:08:51.847Z",
                                "baseDate": "CreatedTime",
                                "eventRule": "UpdatedTime"
                        }
                ]
        },
        "cs": {
                "rsiname": "001 : rsiname",
                "subject": "Human Resources",
                "status": "RS_STATUS",
                "statusDate": "2021-10-21T06:08:51.847Z",
                "discontinue": false,
                "discontinueDate": "2021-10-30T06:08:51.847Z",
                "discontinueComment": "discontinue comment",
                "underDispositionControl": false,
                "phases": [
                        {
                                "phaseNumber": 0,
```

FIG. 6A

```
                    "retentionMonths": 0,
                    "retentionDays": 0,
                    "retentionIntervals": null,
                    "yearEndDay": 1,
                    "yearEndMonth": 1,
                    "disposition": "DISP_2",
                    "defaultProcess": "Mark official",
                    "newStatus": "STATUS_2",
                    "makeRendition": false,
                    "RSIScheduleID": 0,
                    "eventRule": "eventRule"
                }
            ]
        },
        "dctm": {
            "supersedeOnNewVersion": false,
            "metadataImmutable": true,
            "retentionStrategy": "Individual",
            "structuralRetentionType": false,
            "policyRenditionRule": "All Renditions",
            "cascadeRule": "Cascade To Subfolders",
            "virtualDocumentRetention": "Retain Root Only",
            "snapshotRetention": "Retain Root and Children",
            "metadataImmutability": true,
            "vdmRenditionRule" : "All Renditions",
            "globalConditions": ["FRMGlobal","GC2","Globalcondition"],
            "globalAuthorities": ["RetentionManagers", "TetMgrs"],
            "phases": [
                {
                    "phaseNumber": 0,
                    "phaseName": "DCTM phase 1",
                    "dispositionActionCode": "Destroy all",
                    "retentionTriggerCode": "Calculated Date",
                    "retentionYears": 0,
                    "retentionMonths": 0,
                    "retentionDays": 0,
                    "retentionIntervals": null,
                    "yearEndDay": 1,
                    "yearEndMonth": 1,
                    "MixedModeRule": "Serial",
                    "eventFulfillmentRule": "All events are optional",
                    "eventSelectionRule": "Use Earliest Event Date",
                    "rolloverPolicy": "20YearsRetention",
                    "conditions": "condition A",
                    "authorities": "RetentionManagers",
                    "action": "Notification",
                    "notification": "E-mail notification",
                    "folderOperation": null,
                    "recordRelation": null,
                    "actionName": "sample action name",
                    "executionRule": "Phase Entry",
                    "contacts": [
```

FIG. 6B

```
"policyRepo": {
    "groups": [],
    "attributes": [
        {
            "name": "globalconditions",
            "label": "l10n.policyRepo.groups.global conditions",
            "customField": true,
            "dropListName": "global-conditions",
            "type": "string",
            "size": 256,
            "dropList": true,
            "multiValue": true,
            "order": 1,
            "tableColumn": true,
            "tableColumnOrder": 1,
            "updateable": true,
            "mandatory": false,
            "createScreen": true,
            "updateScreen": true,
            "repositories": true,
            "repositoryField": "properties.global_conditions",
            "templateField": [
                {
                    "provider:"       ",
                    "field": "data.dctm.globalConditions"
                }
            ]
        },
        {
            "name": "globalauthorities",
            "label": "l10n.policyRepo.attributes.globalauthorities",
            "customField": true,
            "dropListName": "authorities",
            "type": "string",
```

FIG. 6C

```
{
    "name": "structuralretentiontype",
    "label": "l10n.policyCommon.attributes.structuralretentiontype",
    "group": "policysettings",
    "customField": true,
    "type": "boolean",
    "droplist": false,
    "order": 6,
    "updateable": false,
    "mandatory": true,
    "createScreen": true,
    "updateScreen": true,
    "repositoryField": "properties.is_linked_structural",
    "templateField": [
        {
            "provider": "    ",
            "field": "data.dctm.structuralRetentionType"
        }
    ]
},
{
    "name": "policyrenditionrule",
    "label": "l10n.policyCommon.attributes.policyrenditionrule",
    "group": "policyrules",
    "customField": true,
    "droplistName": "rendition-rules",
    "type": "integer",
    "dropList": true,
    "multiValue": false,
    "order": 0,
    "updateable": true,
    "mandatory": true,
    "createScreen": true,
    "updateScreen": true,
    "repositoryField": "properties.rendition_rule",
    "templateField": [
        {
            "provider": "    ",
            "field": "data.dctm.policyRenditionRule"
        }
    ]
},
{
    "name": "cascaderule",
    "label": "l10n.policyCommon.attributes.cascaderule",
    "group": "policyrules",
    "customField": true,
    "repoDropListName": "propagation-strategies",
    "dropListValues": [
        {
            "label": "l10n.policyCommon.attributes.cascaderule.dropList.cascadeToSubFolders",
            "value": "3"
```

FIG. 6D

```
                                "tableColumn": true,
                                "tableColumnOrder": 2,
                                "mandatory": false,
                                "createScreen": true,
                                "updateScreen": true,
                                "repositories": true,
                                "repositoryField": "properties.global_authorities",
                                "templateField": [
                                        {
                                                "provider": "       ",
                                                "field": "data.dctm.globalAuthorities"
                                        }
                                ]
                        }
                ]
        },
        "phaseCommon": {
                "groups": [
                        {
                                "name": "eventrules",
                                "label": "l10n.phaseCommon.groups.eventrules",
                                "order": 8,
                                "condition": [
                                        "7f9bacdc-4810-4f7d-b5d3-55babe988045"
                                ]
                        }
                ],
                "conditions": [
                        {
                                "id": "4ea71881-57b5-4c26-a43c-4fbc97e74048",
                                "attribute": "dispositionActionCode",
                                "values": [
                                        1,
                                        2,
                                        3,
                                        6,
                                        7
                                ]
                        },
                        {
                                "id": "c8c55ae1-c5c6-43a8-9fff-14fa65f29ee6",
                                "attribute": "retentionIntervals",
                                "values": [
                                        1,
                                        2,
                                        4,
                                        12
                                ]
                        },
                        {
                                "id": "55e441fd-fbfa-437e-a114-a0519716e9e1",
                                "attribute": "retentionTriggerCode",
```

FIG. 6E

| Dashboard Retentions Holds Dispositions Compliance Search Destructions Tasks Audit Records Audit Permissions Roles Systems | | | |
|---|---|---|---|
| ⟳ + ▦ Systems | | | |
| ☐ Status ⇅ | Name ↑ 🔍 | Type | Last Sync |
| ☐ ⊖ | Compliance Center | OTFI | 09/07/2022 2:59:50 PM |
| ☐ ⊘ | Core Content | OT2 | |
| ☐ ⊖ | DCTM Submittals | DCTM | 09/07/2022 2:59:49 PM |
| ☐ ⊖ | Enterprise Content Management | CS | 09/07/2022 2:59:49 PM |
| ☐ ⊖ | Archive Server | IA | 09/07/2022 2:59:49 PM |

FIG. 7A

| Dashboard | Retentions | Holds | Dispositions | Compliance | Search | Destructions | Tasks | Audit | Records | Audit | Permissions | Roles | Systems |

Retentions

New
Imported

| | | Description | OT2 | CS | IA | DCTM | Created ↓ |
|---|---|---|---|---|---|---|---|
| ☐ ˅ | IT-0 | | 0 | 0 | 0 | 0 | 09/12/2022 5:49:49 PM |
| ☐ ˅ | IT-G-02 | Data Element Catalog and Data Dictio... | 1 | 0 | 0 | 0 | 07/26/2022 3:26:55 PM |
| ☐ ˅ | CP-G-02 | Capital Project Program Files | 1 | 0 | 0 | 0 | 10/27/2021 3:19:41 PM |
| ☐ ˅ | FM-G-10 | Accounts Payable and Expenditure Tra... | 1 | 0 | 0 | 0 | 10/15/2021 12:46:23 PM |
| ☐ ˅ | EU-GDPR | Destruction for Right to Erasure, and ... | 0 | 1 | 1 | 0 | 10/15/2021 11:19:45 AM |
| ☐ ˅ | AD-YE-02 | Destroy Items 2 years after Record Da... | 1 | 1 | 0 | 0 | 06/15/2021 1:40:44 PM |
| ☐ ˅ | EU-HR-3YEARS | Data Minimization: Handling of docum... | 0 | 1 | 0 | 0 | 06/15/2021 1:40:43 PM |
| ☐ ˅ | AD-YE-01 | Destroy Items 1 year after Record Date | 0 | 1 | 0 | 0 | 06/15/2021 1:40:43 PM |
| ☐ ˅ | US-HR-7YEAR | Contains annual performance reviews... | 0 | 1 | 0 | 0 | 06/15/2021 1:40:42 PM |
| ☐ ˅ | AD-YE-07 | Destroy Items 7 years after Record Da... | 1 | 1 | 0 | 0 | 06/15/2021 1:40:41 PM |
| ☐ ˅ | AD-YE-06 | Destroy Items 6 years after Record Da... | 0 | 1 | 0 | 0 | 06/15/2021 1:40:41 PM |
| ☐ ˅ | AD-YE-05 | Destroy Items 5 years after Record Da... | 0 | 1 | 0 | 0 | 06/15/2021 1:40:40 PM |
| ☐ ˅ | AD-YE-04 | Destroy Items 4 years after Record Da... | 0 | 1 | 0 | 0 | 06/15/2021 1:40:39 PM |
| ☐ ˅ | AD-YE-03 | Destroy Items 3 years after Record Da... | 0 | 1 | 0 | 0 | 06/15/2021 1:40:37 PM |

15 Items

Policy Attributes: Common

Target system type: DCTM

Policy Settings

Superside on New Version

Metadata Immutable

*Retention Strategy

<None> ⌄

Structural Retention Type

Policy Rules

*Policy Rendition Rule

| <None> ⌄ |
| All Renditions |
| Primary Format Only |

*Virtual Document Retention

<None> ⌄

*Snapshot Retention

<None> ⌄

Virtual Document Management/Snapshot Retention

Metadata Immutable

*VDM Rendition Rule

<None> ⌄

Next   Cancel

FIG. 7I

| Sample 123 ⌄ | | |
|---|---|---|
| ☐ Published | Name 🔍 | Systems |
| ☐ ◷ | OT2 | 1 |
| ☐ ◷ | DCTM | 2 |
| ☐ ◷ | IA | 1 |
| ☐ ◷ | CS | 1 |

4 items

FIG. 7J

FEDERATED COMPLIANCE MAPPING OF DISPARATE CONTENT MANAGEMENT SYSTEMS

CROSS-REFERENCE TO RELATED APPLICATION(S)

This is a continuation of, and claims a benefit of priority under 35 U.S.C. § 120 from U.S. patent application Ser. No. 17/977,796, filed Oct. 31, 2022, entitled "FEDERATED COMPLIANCE MAPPING OF DISPARATE CONTENT MANAGEMENT SYSTEMS," which claims a benefit of priority under 35 U.S.C. § 119(e) from Provisional Application No. 63/273,776, filed Oct. 29, 2022, entitled "FEDERATED COMPLIANCE MAPPING OF DISPARATE CONTENT MANAGEMENT SYSTEMS," which is fully incorporated by reference herein for all purposes.

TECHNICAL FIELD

This disclosure relates generally to compliance management. More particularly, this disclosure relates to systems, methods, and computer program products for hybrid onboarding of compliance systems through centralized federated compliance management utilizing tenant-specific policy mapping definitions.

BACKGROUND OF THE RELATED ART

Currently, a Federated Compliance (FC) service can track an organization's records and manage content retention and metrics regardless of the repository type to provide an enterprise with insight into the enterprise's information governance.

To fetch the compliance data from on-premises ("on-prem") systems, a conventional approach involves fetching data from a Restful Web service (REST) application programming interface (API) into a federated compliance system backend service. Attributes thus retrieved are then evaluated by mapping them to respective FC attributes in the source code. The mapped, converted metadata attributes are stored into a datastore. If data consists of multiple phases, then the data needs to be relatively mapped to join tables in data stores in case of a relational database.

This conventional approach is how most of today's FC services integrate their APIs between services. A producer service provides the API with response payload and a consumer service reads this content through a pre-defined/hard coded object structure.

If an enterprise needs to migrate compliance policies (e.g., policies governing content retentions/holds) from one information system to another information system, the enterprise would need to re-create the compliance policies in the new information system. This is a very tedious and time taking process. Also, if the enterprise is managing multiple information systems, it is not possible to have and manage the same retention/hold policy for all the information systems.

Accordingly, the conventional approach discussed above has the following drawbacks:
  It is not possible to have and manage the same policy (retention/hold) for different information systems.
  Migrating policy (retention/hold) data from one to another information system is a tedious task.
  Switching to a new content service needs a huge amount of manual effort.
  Every information system will have different retention metadata, hence source code must be placed to support each type. This means that the federated compliance service will grow huge.
  If any new properties are introduced, updated, or deleted, then the federated compliance service would need to update its source code to adopt these changes.
  Maintaining multiple information systems with federated compliance is a complex process.
  Dynamically mapping the attributes cannot be performed.

In view of the foregoing, there is room for innovations and improvement in federated compliance management.

SUMMARY OF THE DISCLOSURE

Hybrid onboarding support is essential for FC services, as an FC service needs to perform compliance data import, read, and write operations with multiple types of information systems. Each information system usually has its own retention/hold attributes for managing records stored therein. These retention/hold attributes are unique to each individual system and can have multiple phases. Further, mapping of on-prem retention or hold metadata objects to FC retention or hold metadata is complex and can involve multiple phases.

A goal of this disclosure is to provide a new approach to FC application and services. In some embodiments, this goal is realized in an FC management system operating on a cloud computing platform. The cloud computing platform, referred to herein as the "cloud," includes a cloud-based software as a service (Saas) applications layer that provides various web-based software, on-demand software, and/or hosted software as services. These services enable organizations and enterprises alike to leverage existing on-prem, cloud, or hybrid platform resources, as well as information stored in different repositories, to quickly extend existing solutions to the cloud. The FC management system has an enhanced retention policy service where federated retention policies are stored and an enhanced compliance service where tenant-specific policy mapping definitions are stored.

In some embodiments, the new approach includes the following features:
  Using a policy mapping definition, one information system attribute can be mapped to another information system dynamically.
  Better control from the perspective of tenant administration as the policy mapping definition is tenant-specific, hence tenants can have respective unique mappings for different attributes.
  Retention/hold policies for multiple on-prem information systems can be centrally managed using policy mapping definition files in the FC management system.
  Policy mapping definitions can be reconciled to pick up new fields automatically whenever the compliance service is bootstrapped, allowing on-the-fly attributes to be created/changed if any changes occur in an information system.
  Policy mapping definition supports the attributes to be defined at global/system-specific/phase levels, providing a desired flexibility for categorization (user experience).
  A user interface (UI) of the FC management system renders all the fields based on the policy mapping definition metadata that contains attributes, drop-lists and conditions.
  Conditions can be set to evaluate the data type in the target information system.

Policy mapping definition provides an ability to define a repository mapping field and base mapping for other content server fields as well as default fields.

Repository field mapping for every attribute provides a connection with on-prem information system data. By using this, the compliance service can import the data and write the data to the information system.

Policy mapping definition supports localization for labels.

Versioning support for the policy mapping definition is also available for each information system.

Provisioning a new information system (e.g., a document management system (DMS), content server (CS), content management system (CMS), information archive (IA) system, etc.) is much easier by creating a new policy mapping definition.

In some embodiments, a method of federated management of repositories may comprise, at a central management server, defining a central repository retention policy and defining a plurality of managed repository retention policies associated with the central repository retention policy, each of the managed repository retention policies having a repository type selected from a plurality of repository types, each of the managed repository retention policies having repository attributes. Specifically, each of the managed repository retention polices can be associated with an instance of a repository and values of the repository attributes of each of the managed repository retention policies can be mapped with attributes of the associated repository instance. The method may further comprise defining at least one retention policy value of the central repository retention policy and mapping the at least one retention policy value to each of the managed repository retention policies based on the repository type of each of the managed repository retention policies. The repository types can comprise at least one of: an archival repository type, a cloud-based repository type, or an on-premises enterprise repository type.

In some embodiments, the managed repository retention policies can comprise repository type common attributes defining attributes common to the plurality of repository types, repository type specific attributes defining attributes specific to each of the repository types, phase common attributes defining type phase attributes common to the plurality of repository types, and phase specific attributes defining type phase attributes specific to each of the repository types.

In some embodiments, defining at least one retention policy value of the central repository retention policy can include defining a common phase attribute comprising a phase common attribute or a phase specific attribute and mapping the common phase attribute to at least one of the phase common attributes or at least one of the phase specific attributes of each of the managed repository retention policies.

In some embodiments, the central repository retention policy can be derived from one of the plurality of managed repository retention policies. In some embodiments, the central repository retention policy has master repository attributes inherited by each of the managed repository retention policies and the at least one defined retention policy value is a value of one of the master repository attributes.

In some embodiments, the central management server is coupled to one or more repository servers, with the one or more repository servers managing the associated repository instances. The central repository retention policy can be updated and the update is mapped to the associated managed repository retention policies.

In some embodiments, a method for federated compliance management may comprise importing, by a federated compliance management system operating in a cloud computing environment, a repository-specific retention policy from a source information system communicatively connected to the federated compliance management system over a network, the source information system operating in an enterprise computing environment. The method may further comprise converting, by the federated compliance management system using a policy mapping definition, the repository-specific retention policy into a federated retention policy, the policy mapping definition containing attribute mappings for federated attributes common across a plurality of information systems of disparate types and repository-specific attributes that are specific to the source information system. In some embodiments, the source information system is multi-phased and the policy mapping definition may further comprise phase-common attributes that are common for all phases of the source information system as well as phase-repository-specific attributes that are configured for a specific phase. The federated retention policy can be centrally stored in the cloud computing environment for use by the federated compliance management system in managing, e.g., via a retention policy service, the plurality of information systems including the source information system.

In some embodiments, the method may further comprise determining whether the repository-specific retention policy of the source information system is up for migration to a target information system and, responsive to the repository-specific retention policy of the source information system being up for migration to the target information system, initiating importation of all repository-specific retention policies from the source information system, wherein the repository-specific retention policies are converted into federated retention policies using the policy mapping definition.

In some embodiments, prior to the initiating the importation of all the repository-specific retention policies from the source information system, the method may comprise prompting, via a user interface, a user to select for importation a repository-specific retention policy from all the repository-specific retention policies of the source information system.

In some embodiments, the method may further comprise determining the federated retention policy converted from the repository-specific retention policy from the source information system as a base policy for creating a repository-specific policy for a target information system and preparing, using a policy mapping definition for the target information system and values from the base policy, a payload for a call (e.g., a REST call) to the target information system, the payload including information required by the target information system to create the repository-specific policy, and making the call with the payload thus prepared to the target information system. In response, the target information system is operable to create and store the repository-specific policy locally.

In some embodiments, the policy mapping definition is provisioned to the source information system from a master mapping definition and complies to a common schema internal to the federated compliance management system. In some embodiments, the master mapping definition comprises a template field for which a value is prepopulated from a template when the policy mapping definition is provisioned by the federated compliance management system for the source information system.

In one embodiment, a system may comprise a processor, a non-transitory computer-readable storage medium, and stored instructions translatable by the processor to perform a method substantially as described herein. Another embodiment comprises a computer program product having a non-transitory computer-readable storage medium storing instructions translatable by a processor to perform a method substantially as described herein.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 4A-4C show portions of an example of a basic mapping definition according to some embodiment disclosed herein.

FIGS. 5A-5C show portions of an example of a complex mapping definition according to some embodiment disclosed herein.

FIGS. 6A-6E show portions of an example template that can be used to populate fields of a policy mapping definition according to some embodiment disclosed herein.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Figure 1:
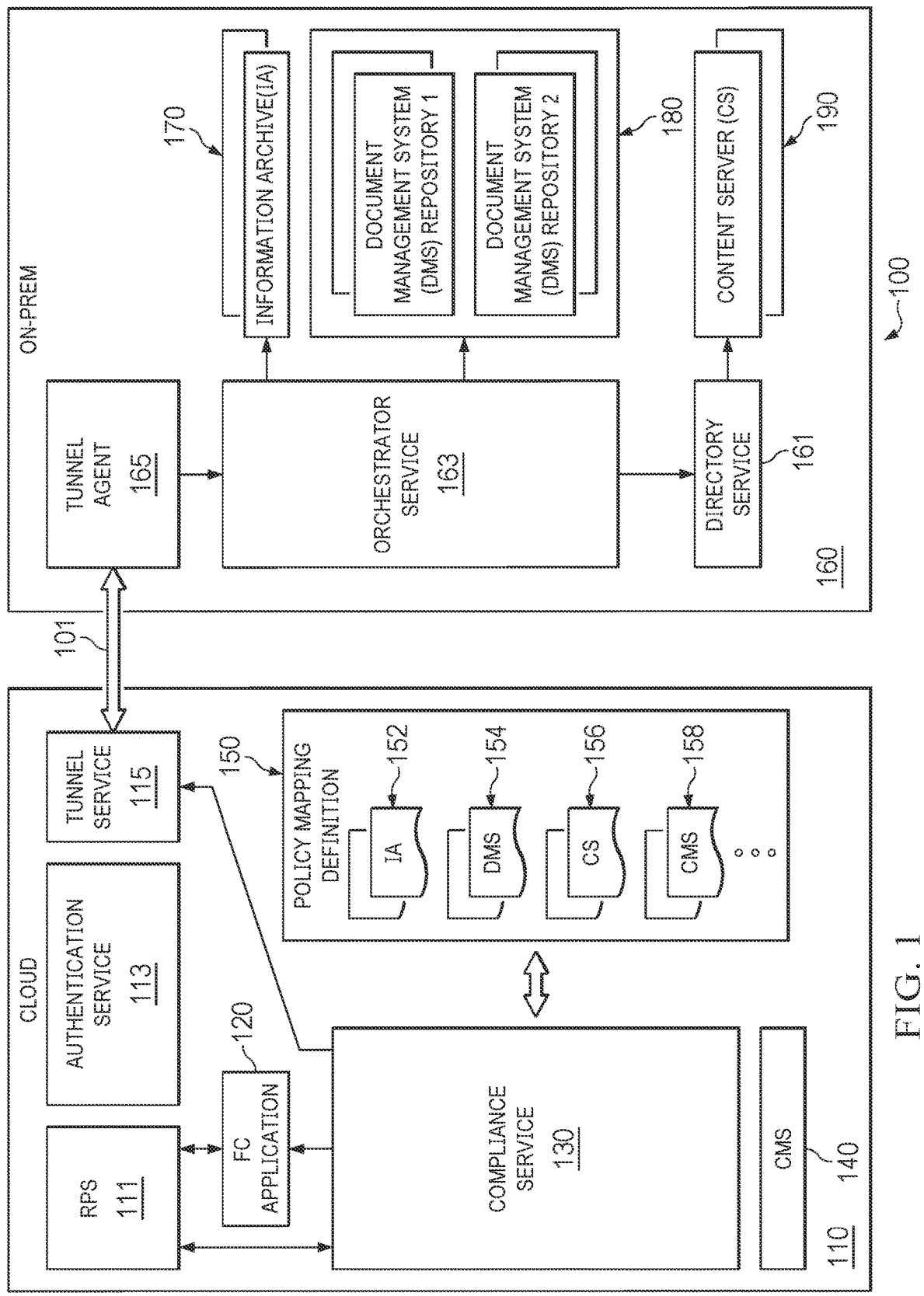
FIG. 1 is an architectural diagram that illustrates a federated compliance management system operating in a cloud computing environment in communication with on-prem information systems operating in an off-the-cloud enterprise computing environment according to some embodiments disclosed herein.

FIG. 1 is an architectural diagram that illustrates an FC management system 110 operating in a cloud computing environment ("cloud"). In the example of FIG. 1, the FC management system 110 is communicatively connected to on-prem information systems 170, 180, 190 operating in an off-the-cloud enterprise computing environment 160 over a secure connection 101.

More specifically, a tunnel agent 165 operating in the off-the-cloud enterprise computing environment 160 works with a tunnel service 115 to provide secure communications between the two computing environments. The on-prem information systems 170, 180, 190 are configured for managing content stored in on-prem repositories.

Communications for the on-prem information systems 170, 180, 190 are received by the off-the-cloud enterprise computing environment 160 through the tunnel agent 165 and handled by an orchestrator service 163. The orchestrator service 163 can communicate, directly or through a directory service 161, with the on-prem information systems 170, 180, 190. The on-prem information systems 170, 180, 190, which can be of different types, are configured for managing content stored in on-prem repositories.

In some embodiments, the FC management system 110 is configured for providing (e.g., based on the SaaS model) a plurality of services, including a retention policy service (RPS) 111, an authentication service 113, and a compliance service 130. The authentication service 113 is configured for authenticating users of the FC management system 110. The RPS 111 and the compliance service 130 are configured for supporting federated policy management over content stored in disparate information systems, including on-cloud repositories (e.g., an on-cloud repository managed by the content management system 140) as well as off-cloud repositories (e.g., repositories managed by on-prem systems 170, 180, 190).

In some embodiments, the RPS 111 is configured for servicing requests, e.g., received via a cloud-based federated compliance (FC) application 120, pertaining to management of federated retention policies centrally stored by the FC management system 110. In some embodiments, the compliance service 130 is configured for handling attribute mapping at various levels (e.g., at a federated level, at a repository level, at a common phase level, at a phase-specific level, etc.) utilizing policy mapping definition 150.

In some embodiments, the FC management system 110 is embodied on a multi-tenant architecture that allows customers (e.g., enterprises) to share computing resources as tenants. When provisioning the computing resources for a tenant (e.g., an enterprise customer), a process sets up a policy mapping definition unique to that enterprise customer based on a master mapping definition file. The master mapping definition file contains mapping definitions for all types of repositories and how to handle attribute mappings internally within the FC management system 110. The master mapping definition file defines, for each information system type, how to represent data stored in a repository to a user of the FC application 120. This representation can be different from tenant to tenant. For instance, a tenant may want to modify a field and/or may only have one or two on-prem information systems installed. Thus, a policy mapping definition file provisioned for a particular tenant can include a subset of the mapping definitions contained in the master mapping definition. As the policy mapping definition is tenant-specific, the tenants of the FC management system 110 can have respectively unique mappings for different attributes of their information systems.

In some embodiments, from the perspective of federated compliance, attributes mapping can take place at different levels:
  Federated attributes: attributes that are common for all information systems (e.g., content management systems, content servers, information archives, repositories, etc.);
  Repository- or information system type-specific attributes: attributes that are specific to a repository type or an information system type;
  Phase-common attributes: attributes that are common for all phases for a given system; and
  Phase-repository-specific attributes: attributes that are configured for a specific phase in a particular repository or information system.

In some embodiments, policy mapping definitions provisioned to individual customers can be stored as part of the compliance service 130. In some embodiments, customers could add fields for desired attributes to their own policy mapping definitions. The FC management system 110 may provide an interface with a functionality that allows a customer to make a change to their policy mapping definition file so that if an extra field is added to their repository, the compliance service 130 is able to map the extra field to a federated policy using the policy mapping definition provisioned to, and edited by, the customer.

As a non-limiting example, a customer may wish to change the label of a data field for a particular attribute used within one of their on-prem information systems. The customer can edit the policy mapping definition so as to tailor their own representation on the screen (e.g., a user interface of the FC application 120). As another example, a customer may wish to change the order in how information is shown on the screen (e.g., a drop list).

In this disclosure, a representation refers to a specific way of representing converted policies (i.e., federated policies) inside the FC management system 110 so that they can be used across disparate information systems, including on-cloud and off-cloud repositories. The policies are imported and converted into the FC management system 110 using the policy mapping definition 150 provisioned for the customer. In some embodiments, the compliance service 130 includes a converter operable to generate a retention policy in a standard format (e.g., a common schema) using the policy mapping definition 150. The converter comprises code for creating a REST call required by a specific repository to create, update, or delete a policy. The common schema supports all repository types, so repository-specific converters are needed to convert and prepare REST calls for individual repositories using mapping definitions.

As a non-limiting example, suppose a customer has the IA 170 and the DMS 180 installed on their premises and wishes to use the DMS 180 as the basis for retention policies over the IA 170. The customer may import the policies specific to the DMS 180 into the FC management system 110. The imported policies are converted by the compliance service 130 and stored by the RPS 110. The IA 170 can be added for FC management via the FC application 120 so that both the IA 170 and the DMS 180 have the same policies and can be managed the same way, even though the IA 170 and the DMS 180 are of different system types.

When a new repository (e.g., the CS 190) is added (e.g., as instructed by a user via the FC application 120) for federated retention policy management, the RPS 111 and the compliance 130 can be modified to support the new repository. This modification may entail adding a mapping definition to the compliance server 130. Likewise, the RPS 111 can be modified to support the new repository by adding/generating a federated retention policy applicable to the new repository to the RPS 111. The RPS 111 takes the generated retention policy and stores it at a central location (e.g., as part of the RPS 111).

In some embodiments, importation of a policy can be automated. For instance, a master mapping definition file can comprise a template with default values set (e.g., by a customer) for mapping definitions. A policy can be created using the default values and stored by the RPS 111. The policy can then be pushed out to multiple types of repositories.

Below is a non-limiting example of a policy mapping definition for a content server referred to as "OTCS". In this example, the policy mapping definition is written in JavaScript Object Notation (JSON).

```
{
  "name": "otcs_policy_mapping_definition",
  "type": "POLICY",
  "repositoryType": "OTCS",
  "mappingVersion": 27,
  "attributeDefinition": {
    "attributes": [
      {
        "name": "name",
        "label": "l10n.otcs.retention.name",
        "type": "string",
        "baseMapping": {
          "dctm": "name",
        },
        "repositoryField": "$.content_suite.retention.title"
      },
      {
        "name": "description",
        "label": "l10n.otcs.retention.description",
        "type": "string",
        "baseMapping ": {
          "dctm": " description ",
        },
        "repositoryField": "$.content_suite.retention.desc"
      }
      {
        "name": "createdDate",
        "label": "l10n.otcs.attributes.createdDate",
        "type": "date",
        "customField": true,
        "customFieldId": "e0db4dd9-06b9-4ce7-bb49-8e9ef9844747",
        # auto-generated by compliance service
        "baseMapping ": {
          "dctm": "dateOfCreation",
        },
        "repositoryField": "$.content_suite.created_date"
      },
      {
```

```
    "name": "retentionTriggerCode",
    "label": "110n.otcs.attributes.retentionTriggerCode",
    "customField": true,
    "customFieldId": "0b56e60e-00d3-47cf-98c0-38fe54ef24cd",
# auto-generated by compliance service
    "type": "integer",
    "baseMapping": {
      "dctm": "triggerCode"
    },
    "repositoryField":
"$.content_suite.retention.codes.retention_trigger_code"
   }
  ]
 }
}
```

Below is a non-limiting example of a policy mapping definition for a document management system referred to as "DCTM":

```
{
  "name": "dctm_policy_mapping_definition",
  "type": "POLICY",
  "repositoryType" : "DCTM",
  "mappingVersion" : 9,
  "attributeDefinition": {
    "attributes": [
      {
        "name": "name",
        "label": " 110n.dctm.retention.name",
        "type": "string",
        "baseMapping ": {
          "otcs" : "name"
        },
        "repositoryField": "$.policy.object_name"
      } ,
      {
        "name": " description ",
        "label": " 110n.dctm.retention.description",
        "type": "string",
        "baseMapping ": {
          "otcs": " description "
        },
        "repositoryField": "$.policy.summary"
      }
      {
        "name" : "dateOfCreation",
        "label": "110n.dctm.attributes.dateOfCreation",
        "type": "date",
        "customField": true,
        "customFieldId" : "c6baad87-3459-4daa-9ad1-14a4653ae7fd",
# auto-generated by compliance service
        "baseMapping ": {
          "otcs" : "createdDate"
        },
        "repositoryField": "$.policy.attributes.date_of_creation"
      } ,
      {
        "name": "triggerCode",
        "label": "110n.dctm.attributes.triggerCode",
        "type": "integer",
        "customField": true,
        "customFieldId" : "c6baad87-3459-4daa-9ad1-14a4653ae7fd",
# auto-generated by compliance service
        "baseMapping ": {
          "otcs": "retentionTriggerCode"
        },
        "repositoryField": "$.policy.retention_trigger_code"
      }
    ]
  }
}
```

Figure 2A:
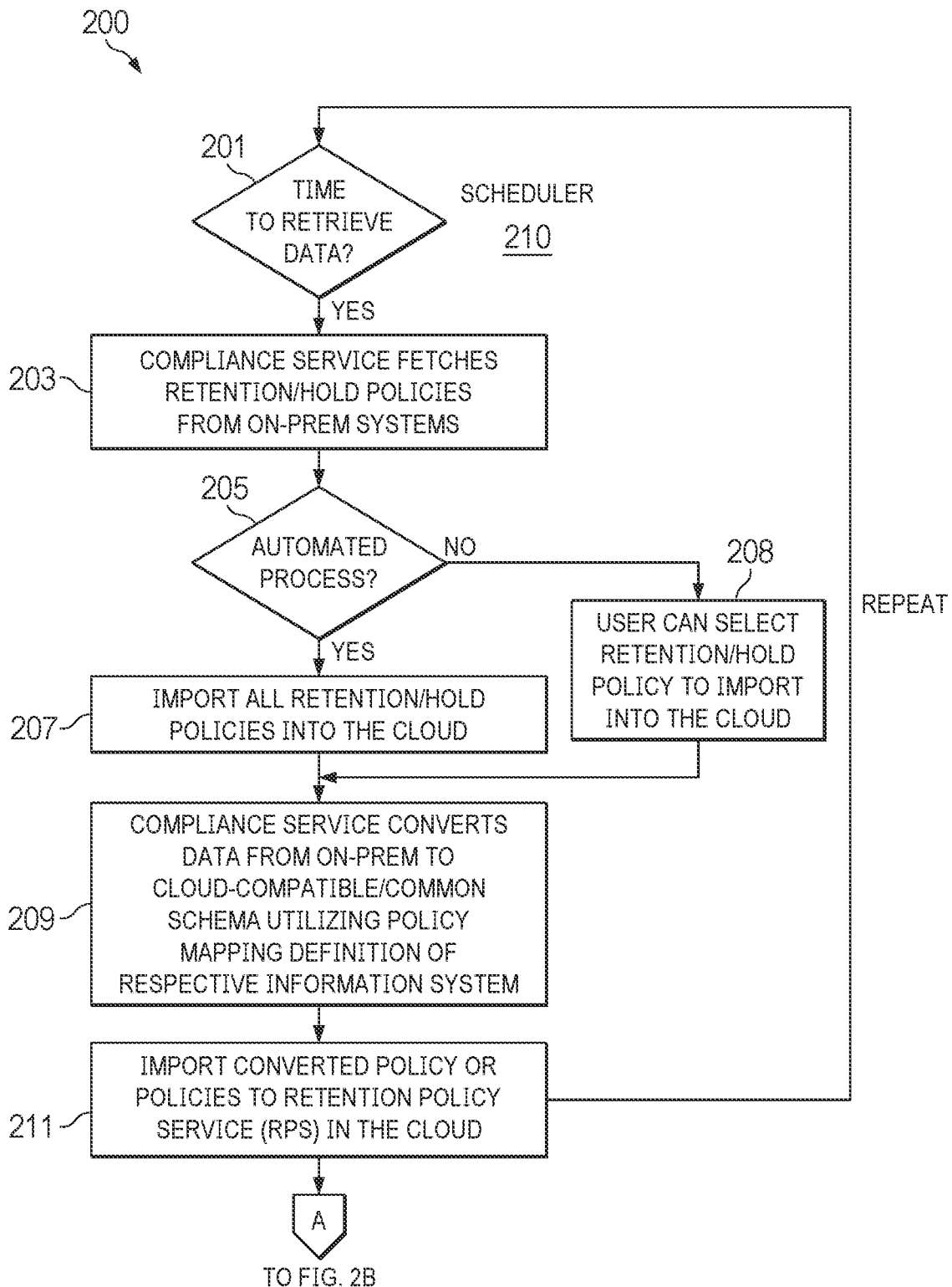
FIG. 2A depicts a flow diagram illustrating an example of a process performed by a federated compliance management system according to some embodiments disclosed herein.

FIG. 2A depicts a flow diagram illustrating an example of a process 200 performed by a FC management according to some embodiments disclosed herein.

In the example of FIG. 2A, the process 200 is operable to import retention/hold policies from a source information system. The compliance service may comprise or work with a scheduler 220 for determining whether it is time to retrieve data (201). If so, the compliance service is operable to fetch the retention/hold policies from the on-prem systems (203). In some embodiments, the flow 200 may include a decision logic operable to determine whether an automated process applies (205). If so, the compliance service is operable to import all retention/hold policies from the source information system to the cloud (207). If not, a user can be prompted to select what retention/hold policy is to be imported into the cloud (208). The compliance service then can convert the data from the on-prem format to one that complies with the common schema, utilizing the policy mapping definition of a respective information system (209). The converted policy (or policies) can then be stored in the cloud for use by the retention policy service (211).

Figure 2B:
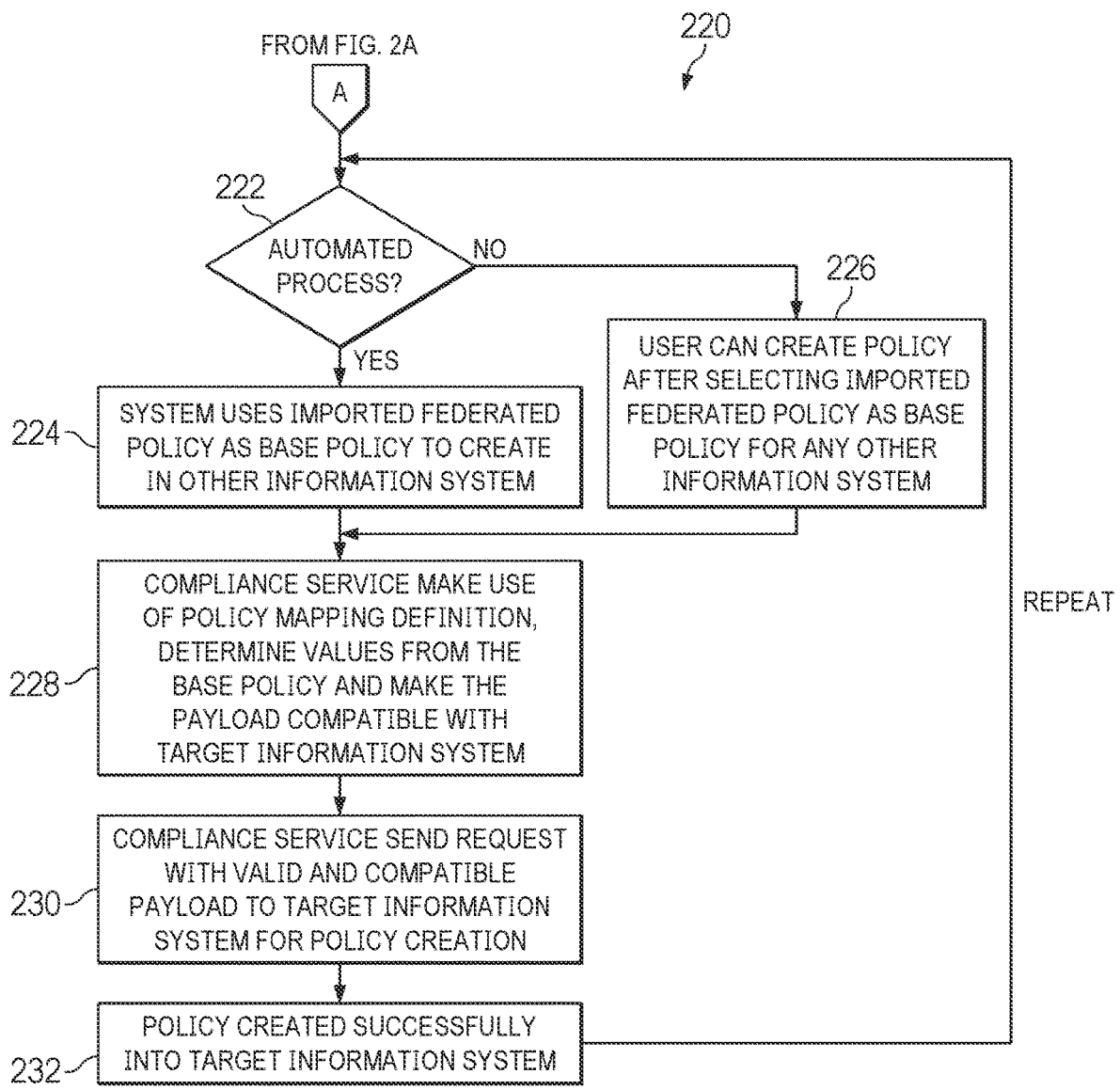
FIG. 2B depicts a flow diagram illustrating an example of another process performed by the federated compliance management system of FIG. 2A according to some embodiments disclosed herein.

FIG. 2B depicts a flow diagram illustrating an example of a process 220 performed by an FC management according to some embodiments disclosed herein.

In the example of FIG. 2B, the process 220 is operable to create a repository-specific policy using an imported policy as a base policy and push the repository-specific policy to a target information system. In this example, the compliance service is operable to determine whether to automatically use an imported policy as a base policy for another information system (222). If so, the imported policy (which is converted from a format specific to the source information system into the standard format internal to the FC management system) is used by the FC management system as the base policy (224). If not, a user can be prompted to create a repository-specific policy for any available information system (e.g., a target information system) after selecting an imported policy as the base policy (226). The compliance service makes use of the policy mapping definition, determines the values from the base policy, and makes the payload of a REST call compatible with the target information system (228). The compliance service then makes a request (e.g., via the REST call to create a policy) to the target information system with the valid and compatible payload as required by the target information system (230). The target information system then creates a repository-specific policy using information from the payload and stores the repository-specific policy locally (232).

Below is a non-limiting example of moving or migrating a 3-year retention policy from a source information system (e.g., "otcs") to a target information system (e.g., "dctm"). The 3-year retention policy for the source information system is as follows:

```
{
  "otcs": {
    "retention": {
      "title": "3 years retention",
      "desc": "To be retained for 3-year period",
      "codes": {
        "retention_trigger_code": "1"
      }
    },
    "created_date": "03/06/2021"
  }
}
```

Step 2. The user imports the above policy into the FC management system utilizing a policy mapping definition. By using repository_field, it maps source information system attributes (e.g., repository-specific attributes) into FC management system attributes (e.g., federated attributes). Below is an example of a federated policy after the mapping.

```
{
  "name": "3 years retention",
  "description": "To be retained for 3-year period",
  "createdDate": "03/06/2021",
  "retentionTriggerCode": "1"
}
```

Step 3. The user can create a target information system policy by using the above-mentioned source information system policy as a base policy. Using base_mapping attribute of the policy mapping definition, the following federated policy for the target information system can be generated.

```
{
  "name": "3 years retention",
  "description": "To be retained for 3-year period",
  "dateOfCreation": "03/06/2021",
  "triggerCode": "1"
}
```

Step 4: The above policy is processed and the structure below is generated. The same is pushed into the on-prem target information system (e.g., "dctm") by the FC service.

```
{
  "policy": {
    "object_name": "3 years retention",
    "summary": "To be retained for 3-year period",
    "retention_trigger_code": "1",
    "attributes": {
      "date_of_creation": "03/06/2021"
    }
  }
}
```

The new approach described above has the advantage of supporting the hybrid onboarding, which enables tenants (enterprises) to manage the same retention or hold policy across different information systems. Migrating retention/hold policies from one information system to another can be a smooth, streamlined process by using the FC policy mapping definition described above.

Also, incorporating any changes in the on-prem information system attributes can be achieved dynamically by updating the policy mapping definition. If an API response payload is changed, then in runtime, the compliance service can map to the correct fields using the policy mapping definition. Using the attribute definition, user input field properties like data type, view, condition, i18n, and so on, can be customized easily. Policy mapping definitions can be created for tenants, giving them the flexibility to have their own attribute mappings.

In the field of SaaS, services use APIs as their communication methodology for exchanging the data. Accordingly, by creating a policy mapping definition to map the attributes between information systems and attribute definition to control the user experience solves a tedious process of on-boarding different content services.

A common, long-standing problem occurs in management of data retention policies over multiple content management systems which manage and store data across multiple life cycles. Often, an enterprise and/or organization manages and stores data over different content management systems which manage and store repository data in multiple formats and types. Content management systems may widely differ in defined attributes, data types, and retention capabilities and functions.

Some content management systems and the repositories they manage are built for fluid data management and storage capabilities and tasks. Here, content management systems are primarily designed to import, format, classify, analyze, and transform data etc. In contrast, other content management systems facilitate "at-rest" storage, often referred to as archival and/or secondary storage systems. Here, the primary function is to store the data so that it may be recalled if needed and often includes a disposal function where data is permanently deleted.

The inventive subject matter comprises computer and machine-driven architectures, methodologies, and techniques for federated management of data retention policies over different data repositories. Moreover, a central repository retention policy is defined to manage retention policies for a set of distributed data repositories. The central repository retention policy maps data attributes and policy phases between and among different repository types of the data repositories. Such mappings are applied to share and distribute retention policies from a central source. Advantageously, the inventive subject matter uses a centrally managed, federated data retention policy approach that overcomes many of the problems of retention management on disjointed, siloed data systems. Multi-format, federated mapping and central management between and among different data repositories can greatly facilitate a comprehensive retention strategy to comply with data retention laws and regulations as well as corporate mandates, procedures, and data systems.

Figure 3:
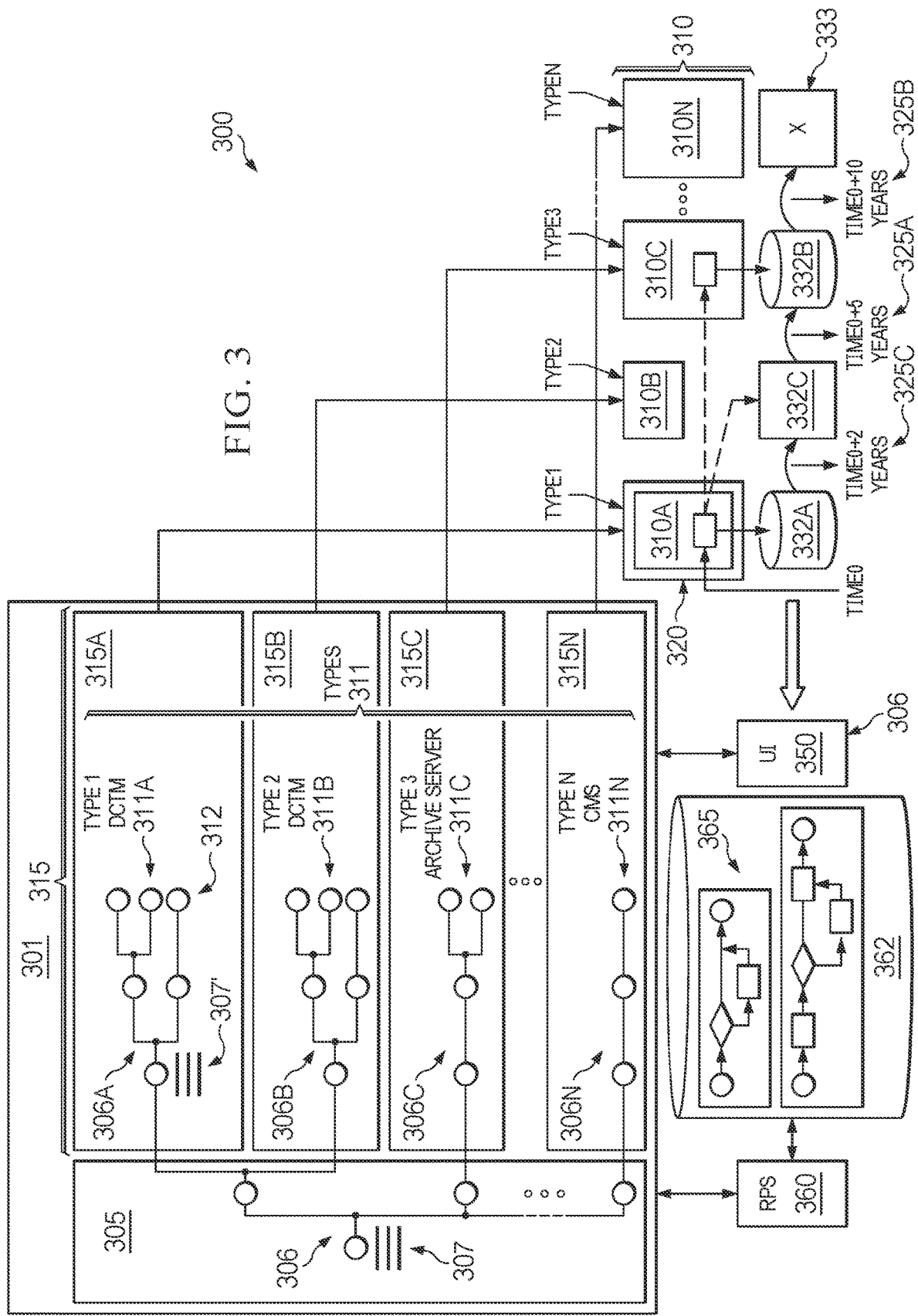
FIG. 3 depicts a diagrammatic representation of an example architecture having a central management server and a central repository retention policy for federated management of repositories according to some embodiment disclosed herein.

Referring now to FIG. 3, a non-limiting embodiment of an architecture 300 (and operations thereon) defines, at a central management server 301, a central repository retention policy 305 for federated management of repositories (generally designated by reference numeral 310). Managed repository retention policies (generally designed by reference numeral 315) are defined and associated with the central repository retention policy 305, each having a repository type (a non-limiting example of a set of repository types is designated by reference numeral 311). The repository types 311 are selected from a group of repository types (e.g., 311A, 311B, 311C, . . . , 311N). Non-limiting examples of repository types include Documentum (DCTM), Content Server, Archive Service, and Content Management System, all manufactured by OpenText Corporation of Waterloo, Canada. Other types of repository types may be included, including those from other manufacturers.

Each managed repository retention policy (e.g., 315A, 315B, 315C, up to or beyond 315N) has a set of attributes (an example of which is designated by reference numeral 312) based on its repository type 311 and is associated with an instance of a repository 310. Here, the managed repository retention policies 315 essentially control the retention characteristics of the associated repository instances 310. In a non-limiting example, managed repository retention policy 315A is defined and associated with repository instance 310A having a repository type TYPE1 (311A) which happens to be DCTM. Managed repository retention policy 315A may be configured based on the attributes of repository type TYPE1 311A and the values defined for repository 310A.

Managed repository retention policies 315A, 315B, 315C, 315N are "mapped" to central repository retention policy 305. In this way, a retention policy value 306 may be defined for central repository retention policy 305 and mapped 306A, 306B, 306C, 306N to managed repository retention policies 315A, 315B, 315C, 315N (respectively) and more specifically to the attributes 312 of each managed policy 315. Mapping from the central value 306 to the managed attributes 312 may be programmatically controlled and is determined based at least in part on the repository type 311 of the managed repository retention policy 315.

Repository mappings may be defined and programmed for each repository type. It should be noted that the managed repository retention policies 315 manage retention policies for the associated repositories 310. The associated repositories 310 are instances of repositories defined and executed for an enterprise and/or organization. Such instances (for example, instance 310A) execute on servers (for example, 320) which may include a cluster of servers for scaling and load-balancing.

Moreover, repository policies 315 can be said to have different attributes 312 again, based on the repository type 311. In some embodiments, managed repository retention policies 315 comprise repository type common attributes defining attributes common to the repository types 311, and repository type specific attributes defining attributes specific to each of the repository types 311. Type common attributes are those common to all repository types 311, such as a repository name, a repository identifier, the create-date of the repository, etc. Type specific attributes are those that are unique to a repository type 311, such as a particular repository type setting, format specific information, type versioning, etc.

Furthermore, managed repository retention policies 315 comprise phase common attributes defining type phase attributes common to the repository types 311, and phase specific attributes defining type phase attributes specific to each of the repository types 311. For example, a phase common attribute may be the definition of a single phase because all repository types 311 have at least one phase, whereas phase specific attributes may be the definitions of multiple phases for a subset of repository types 311 with more than one phase.

A phase common attribute may be defined that is common to all repository types 311. For example, all repositories have a notion of when data is moved to a static storage phase, which may be referred to as a "static-storage date". Here, the static-storage date is set in the central repository retention policy 305 and propagated to all the mapped repository retention polices 315.

A phase specific attribute may be defined that is unique to a repository type and all the repositories of that type. As described above, some types have multiple phases and others a single phase. In such instances, when a multiple phase value is set in the central repository retention policy 305, it is mapped to a multi-phase repository for a particular phase, whereas for a single-phase repository, it is mapped (or even ignored) to the one phase. Repository types 311 that have more transactional capabilities may indeed have multiple phases, where archival repository types may have a single phase (i.e., store the data "at rest").

Referring again to FIG. 3, a non-limiting example of federated data retention policy management includes both multi-phase repositories (311A, 311B) and single-phase 311C repository types mapped to central repository retention policy 305. Managed repository retention policy 315A is associated with multi-phase repository 310A which initially has two phases, a first phase where data is actively managed, and a second phase, where data is archived. Managed repository retention policy 315C is associated with single-phase repository 310C which has a single archive phase.

Multi-phase repository 310A initially has two phases. Data is moved into repository 310A at TIME0 and stored at database 332A. Initially, a first phase 325A, at TIME0 plus 5 years (the "static-storage date"), data is moved from database 332A to archived storage 332B at single phase repository 310C. At a second phase 325B at TIME0 plus 10 years, data is permanently deleted at 333. In contrast, single phase repository 310C has a single phase, which is the same as phase 325B for the multi-phase repository 310A, namely, deleting the data from archive storage 332B.

As part of an overall data retention strategy, a phase specific attribute is be defined for an additional phase that moves the data from one storage to another at TIME0 plus 2 years. A new phase is added to the central repository retention policy 305 which is propagated to multi-phase repository 310A by adding a new phase 325C in between phase 325A and phase 325B. The new phase information includes the different storages to move the data from 332A and to 332C. Once added, the multi-phase repository 310C will have three phases. Yet the archive repository 310C is left unchanged because it does not recognize inter-storage data movement. The static-storage date (i.e., TIME0 plus 5 years) remains unchanged; the data will still be moved from the multi-phase repository 310A to the single-phase repository 310C at the static-storage date and deleted at TIME0 plus 10 years.

In some embodiments, central repository retention policy 305 has master repository attributes 307, such as name, identifier, create-date, etc. The master repository attributes 307 may be inherited by each of the managed repository retention policies 315. For example, the managed repository retention policies 315 may inherit the name and identifier from master attributes 307' to properly refer to the central policy 305.

The central repository retention policy 305 may be defined using a user interface 350 to input initial values. The central repository retention policy 305 may also be based on an existing repository instance 310. Here, the retention policy of the existing repository instance serves to initialize the central retention policy 305 and is, in a sense, a source retention policy. This may be useful when it is desired or needed for one of the existing repositories to serve as a master retention policy. Once tied to the central retention policy 305, changes to it may be appropriately propagated to the other repositories 310 of the enterprise or organization.

In addition, user interface 350 may be used to setup the managed repository retention policies 315. User interface 350 may list a set of potential repositories 310 of an enterprise or organization to federate with the central repository server 301. Once a repository is selected, a set of repository attributes 312 may be initialized with the retention values of the selected repository and modified as desired. Here, the attribute mappings may be referred, but the actual mappings are performed by the central repository server 301. In still a further embodiment, a Retention Policy Service 360 may perform the mappings, based on mapping logic 365 stored in a database 362.

As described above, the repository types 311 may serve a variety of data lifecycle needs, desires, and/or applications. For example, a repository type (such as 311A and 311B) may be an enterprise-level repository type that handles multiple users, groups, permissions, roles, policies, phases, etc. of an enterprise or organization. Yet another repository type 311C may be solely for data archiving. Another type 311N may be oriented toward data policy retention in the cloud and across distributed systems. Yet still another may be oriented for single users or small groups of users and smaller enterprises. Advantageously, this federated repository retention policy approach is highly flexible and adaptive.

FIGS. 4A-4C show portions of an example CMS policy mapping definition which represents an example of a basic mapping definition. FIG. 4A shows that the CMS policy mapping definition describes UI elements (e.g., title, description, etc.) and how to render the UI elements. The CMS policy mapping definition has different sections, policy comments, individual phases, as well as information for each attribute (e.g., type, size, screen position, etc.). There can be information about what languages to use for labels, what fields are updatable, what fields are custom, whether there is a drop list, where the values come from, etc. FIG. 4B shows template fields with values populated from a template. The template fields can be used to automatically prepopulate (e.g., which provider, where the data is, etc.) when a new mapping definition is created. FIG. 4C shows an example of a condition for when an attribute is built on another attribute when the condition is met.

FIGS. 5A-5C show portions of an example DCTM policy mapping definition which represents an example of a more complex mapping definition. FIG. 5A shows that a DCTM repository type can have a minimum of two phases and up to seven phases. By contrast, the example CMS policy mapping definition shown in FIG. 4A defines a single phase. This means that content is stored for a period of time and deleted afterwards. Likewise, an IA repository type has only a single phase as content is archived for a retention period and destroyed once the retention period ends. FIG. 5A also shows fields for common policy settings, policy rules, retention snapshots, and conditions. FIG. 5B shows an example of a drop list enabled for a custom field configured for showing retention strategy information. FIG. 5C shows a repository field containing repository-specific information (e.g., a retention strategy identifier). This can be an actual field that maps to the DCTM-type repository and that is used by the FC management system to generate the drop list.

FIGS. 6A-6E show portions of an example template that can be used to populate fields of a policy mapping definition. FIG. 6A shows attributes such as phase for multiple repository types (e.g., CMS, CS, DCTM, IA). FIG. 6B shows an example of where a default value can be set (e.g., the retention strategy field is set to "individual" for the DCTM repository type). FIG. 6C shows examples of repository-specific attributes (e.g., under the "policyRepo" section). FIG. 6D shows examples of attributes that apply across repositories (e.g., a retention strategy). FIG. 6E shows examples of attributes that are common across phases. As discussed above, attribute mapping using a policy mapping definition can be particularly beneficial to migrating policies (e.g., compliance policies that govern retention/hold periods) from one information system to another information system, even if the information systems are of different types (e.g., migrating the retention policies from a cloud-based CMS system to an on-prem IA system). Using a template as discussed above can further streamline the creation of a policy mapping definition.

FIG. 7A depicts an example of a user interface of an FC management system. In this example, the user interface shows a list of systems of various types, including OTFI, OT2, DCTM, CS, and IA. DCTM, CS, and IA have been discussed above. OTFI is an example of a file-based intelligence platform that helps to identify, classify, and manage file-based content to ensure compliance. OT2 is an example of a cloud-based platform that provides an on-cloud repository.

Figure 7C:
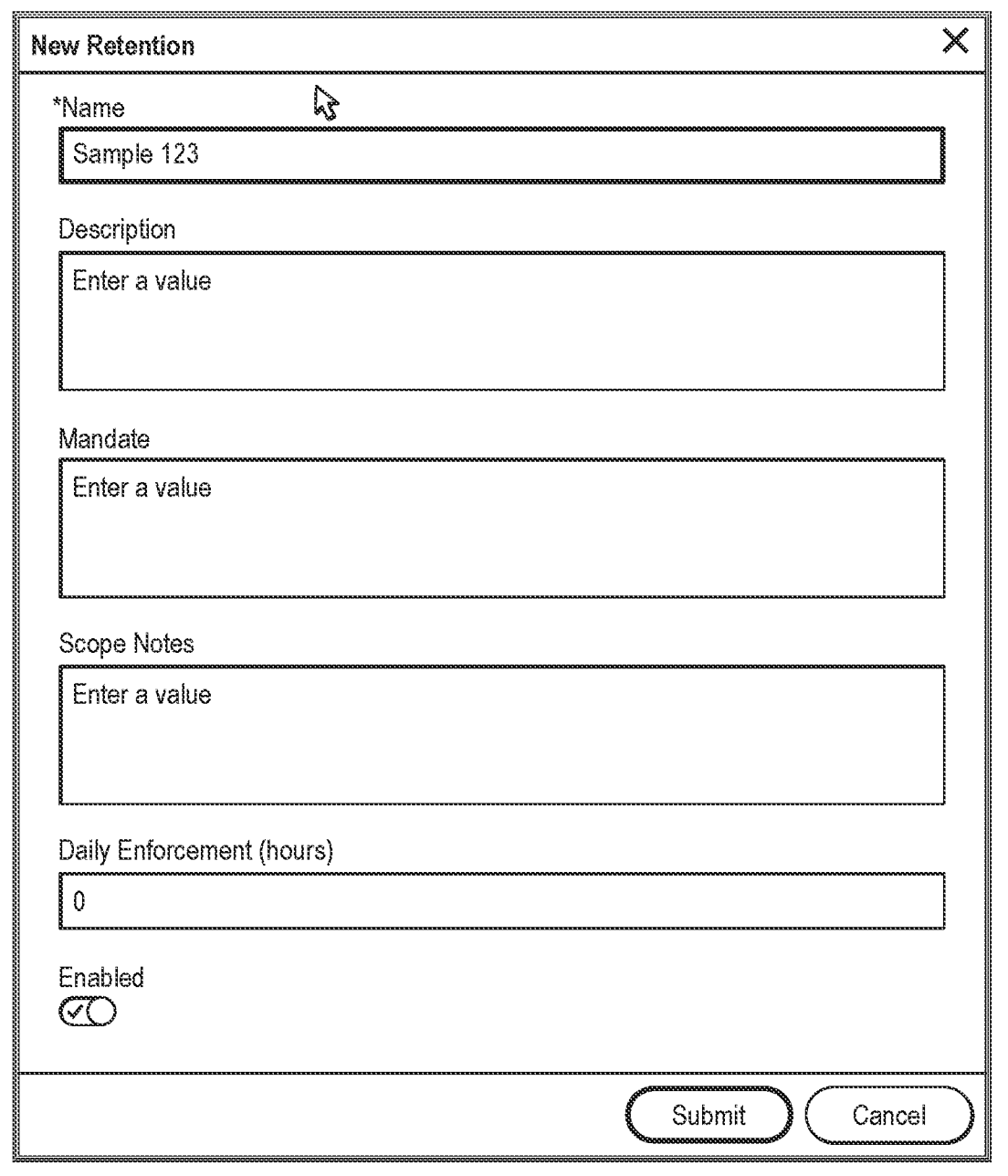
Figure 7D:
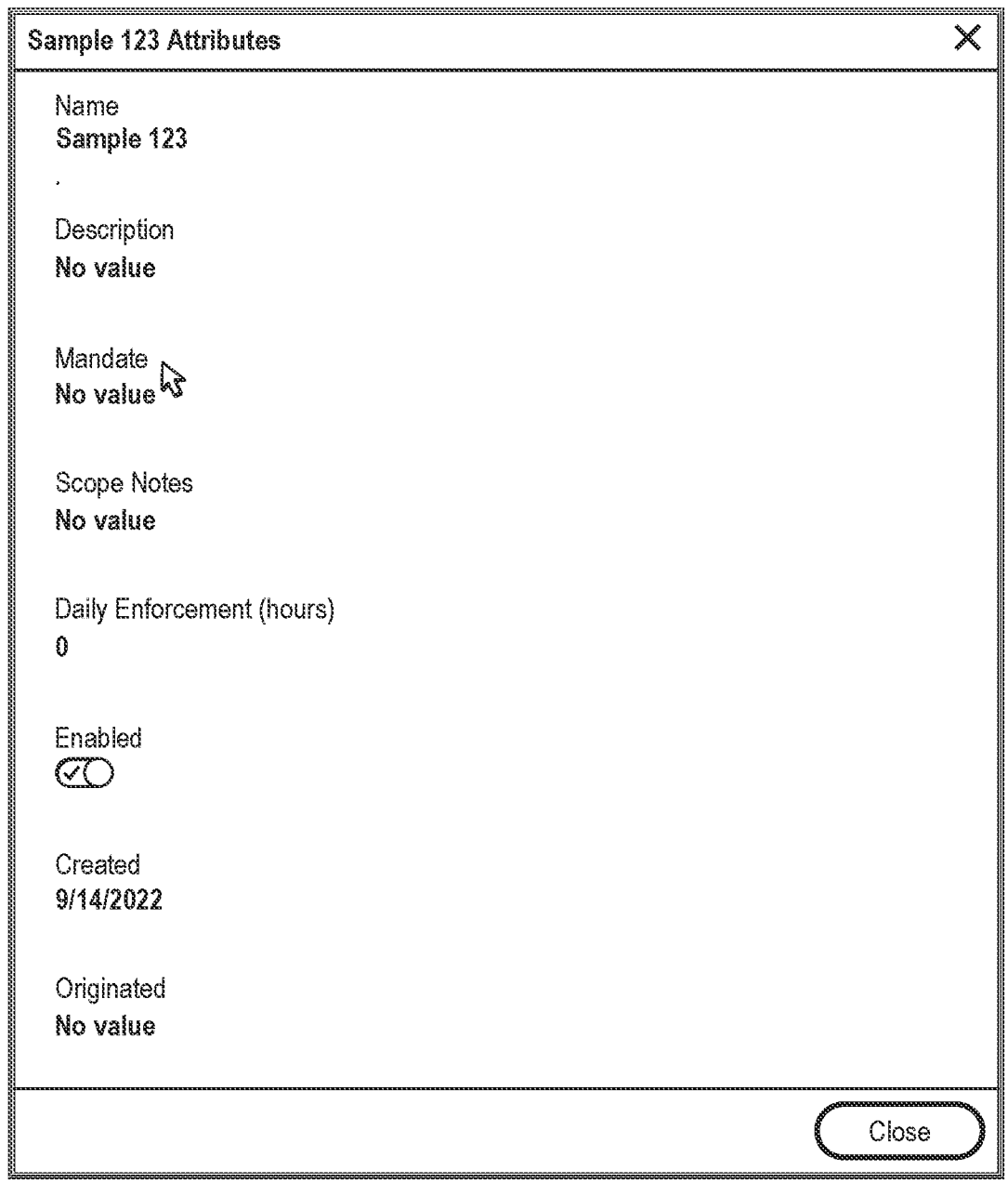
FIGS. 7A-8 depict user interface examples of a federated compliance management system according to some embodiment disclosed herein.
Figure 7E:
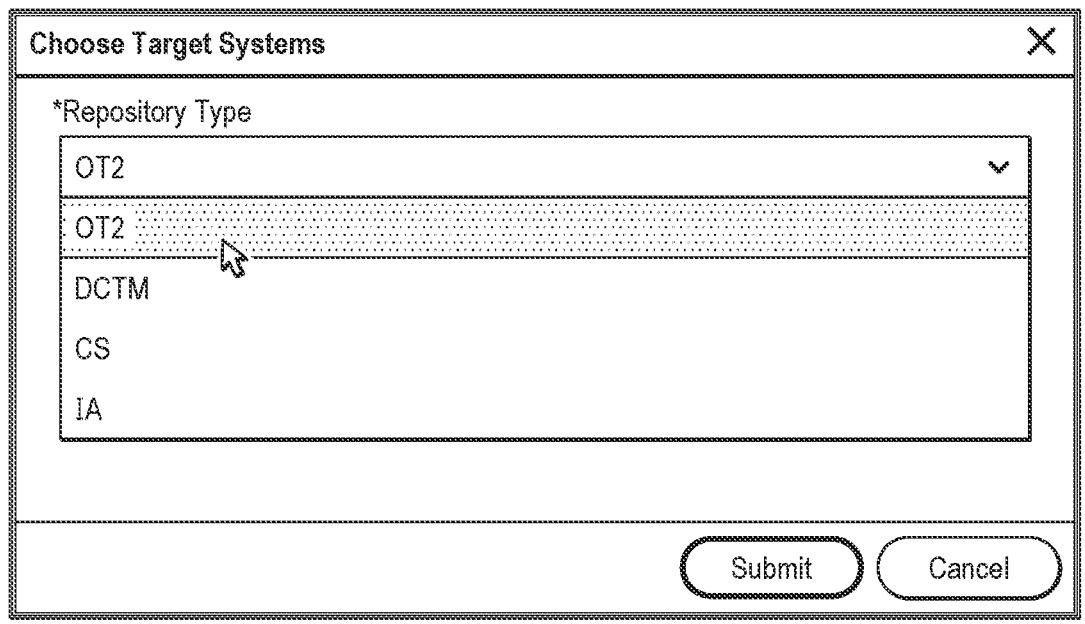
Figure 7F:
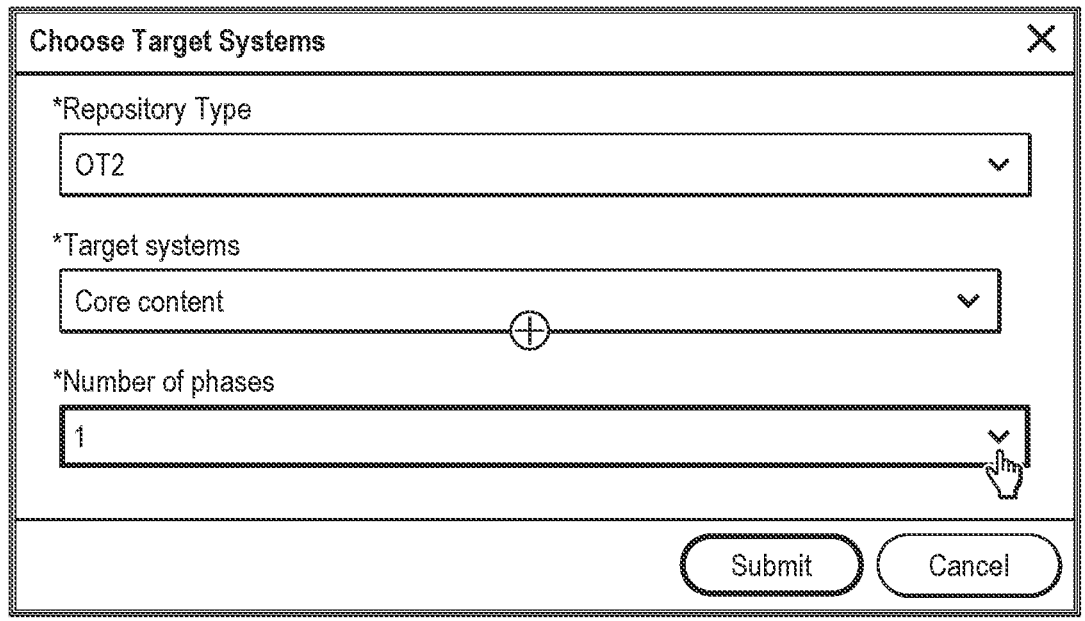
Figure 7G:
Figure 7H:

FIGS. 7B-7D show that a user of the FC management system can create, through a new retention policy creation popup window (FIG. 7C), a new federated retention policy (e.g., "Sample 123") with initially empty attribute fields (FIG. 7D). The user can then begin, through a "Choose Target Systems" popup window (FIG. 7E), configuring the new retention policy to target existing system(s). FIGS. 7E-7F show that the user can select, from a drop list of repository types supported by the FC management system (FIG. 7E) and a drop list of existing systems (FIG. 7F), a target system of a particular repository type and specify the number of phase(s) for the target system (FIG. 7F). FIG. 7G shows a configuration popup window for configuring phase common attributes for the target system. FIG. 7H shows a configuration popup window for configuring phase attributes that are specific to the target system. The complexity of configuration steps can vary depending upon the type of the target system under configuration. FIG. 7I shows an example of a more complex configuration for a target system of the DCTM type.

Figure 7K:

In this way, the user can configure, for each desired target system, federated attributes (e.g., for the newly created retention policy "Sample 123") common across disparate systems, repository- or system type-specific attributes, phase-common attributes for the respective target system, and phase-repository-specific attributes. FIG. 7J shows an example list of target systems that can now be managed through the newly created retention policy. FIG. 7K shows a plurality of retention policies, including the newly created retention policy, that can be centrally managed via the FC management system and that can apply to information systems of disparate types.

Figure 8:

In some embodiments, the FC management system also provides the ability to add a new information system to a federated retention policy. FIG. 8 shows an example of a user interface for adding a new information system (e.g., by specifying the type and the location such as the system address of the new information system). Once the new information system is added, the user can select an existing federated retention policy and select the newly created information system as a target system to which the federated retention policy applies. Alternatively, the user can import or create a new federated retention policy as discussed above and configure the newly created information system as a target system to which the newly created federated retention policy applies.

Figure 9:
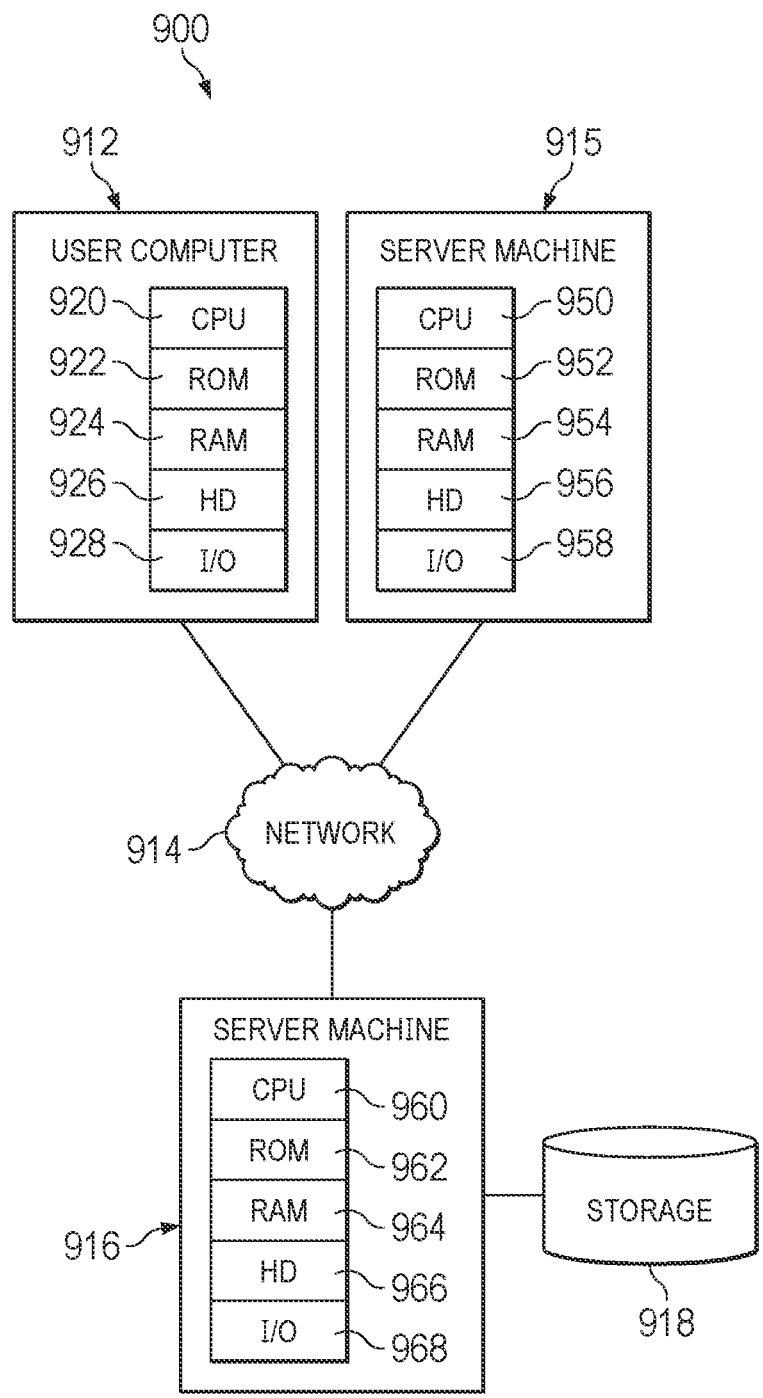
FIG. 9 depicts a diagrammatic representation of an example of networked data processing systems for implementing some embodiment disclosed herein.

FIG. 9 depicts a diagrammatic representation of an example of networked data processing systems for implementing some embodiment disclosed herein. In the example illustrated, network computing environment 900 includes network 914 that can be bi-directionally coupled to user computer 912, server machine 915, and server machine 916. Server machine can be bi-directionally coupled to persistent storage 918. Network 914 may represent a combination of wired and wireless networks that network computing environment 900 may utilize for various types of network communications known to those skilled in the art.

For the purpose of illustration, a single system is shown for each of user computer 912, server machine 915, and server machine 916. However, with each of user computer 912, server machine 915, and server machine 916, a plurality of computers (not shown) may be interconnected to each other over network 914. For example, a plurality of user computers 912 and a plurality of server machines 915 may be coupled to network 914. User computer 912 may include data processing systems for communicating with server machine 916. As a non-limiting example, a dashboard user interface may run on user computer 912 and be communicatively connected to a dashboard monitoring system running on server machine 916. Server machine 916 may represent a node in an ecosystem. An ecosystem component running on server machine 916 may be configured for publishing or providing real time activity and event information to the dashboard monitoring system running on server machine 916 as described above.

User computer 912 can include central processing unit ("CPU") 920, read-only memory ("ROM") 922, random access memory ("RAM") 924, hard drive ("HD") or storage memory 926, and input/output device(s) ("I/O") 928. I/O 928 can include a keyboard, monitor, printer, electronic pointing device (e.g., mouse, trackball, stylus, touch interface, etc.), or the like. User computer 912 can include a desktop computer, a laptop computer, a personal digital assistant, a cellular or smart phone, or nearly any device capable of communicating over a network. Server machine 916 may be similar to user computer 912 and can comprise CPU 960, ROM 962, RAM 964, HD 966, and I/O 968. Likewise, server machine 915 may include CPU 950, ROM 952, RAM 954, HD 956, and I/O 958. Many other alternative configurations are possible and known to skilled artisans.

Each of the computers in FIG. 9 may have more than one CPU, ROM, RAM, HD, I/O, or other hardware components. For the sake of brevity, each computer is illustrated as having one of each of the hardware components, even if more than one is used. Each of computers 912, 915, and 916 is an example of a data processing system. ROM 922, 952, and 962; RAM 924, 954, and 964; HD 926, 956, and 966; and database 918 can include media that can be read by CPU 920, 950, or 960. Therefore, these types of memories include non-transitory computer-readable storage media. These memories may be internal or external to computers 912, 915, or 916.

Portions of the methods described herein may be implemented in suitable software code that may reside within ROM 922, 952, or 962; RAM 924, 954, or 964; or HD 926, 956, or 966. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips.

Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals, or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the foregoing specification, the invention has been described with reference to specific embodiments. However, one of ordinary skills in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. The scope of the disclosure should be determined by the following claims and their legal equivalents.

What is claimed is:

1. A method of federated management of repositories, comprising:
    at a central management server, defining a central repository retention policy;
    defining managed repository retention policies associated with the central repository retention policy, each of the managed repository retention policies having a repository type selected from a plurality of repository types, each of the managed repository retention policies having repository attributes, the defining comprising:
        associating each of the managed repository retention polices with an instance of a repository; and
        mapping values of the repository attributes of each of the managed repository retention policies with attributes of the associated repository instance;
    defining at least one retention policy value of the central repository retention policy; and
    mapping the at least one retention policy value to each of the managed repository retention policies based on the repository type of each of the managed repository retention policies;

wherein the managed repository retention policies comprise:
  repository type common attributes defining attributes common to the plurality of repository types;
  repository type specific attributes defining attributes specific to each of the repository types;
  phase common attributes defining type phase attributes common to the plurality of repository types; and
  phase specific attributes defining type phase attributes specific to each of the repository types.

2. The method of claim 1, wherein defining at least one retention policy value of the central repository retention policy comprises:
  defining a common phase attribute comprising a phase common attribute or a phase specific attribute; and
  mapping the common phase attribute to at least one of the phase common attributes or at least one of the phase specific attributes of each of the managed repository retention policies.

3. The method of claim 1, wherein the central repository retention policy has master repository attributes inherited by each of the managed repository retention policies and the at least one defined retention policy value is a value of one of the master repository attributes.

4. The method of claim 1, wherein the central management server is coupled to one or more repository servers, the one or more repository servers managing the associated repository instances, further comprising:
  updating the central repository retention policy; and
  mapping the update to the associated managed repository retention policies.

5. The method of claim 1, wherein the central repository retention policy is derived from one of the managed repository retention policies.

6. The method of claim 1, wherein the repository types comprise at least one of: an archival repository type, a cloud-based repository type, or an on-premises enterprise repository type.

7. A system for federated management of repositories, comprising:
  a computer processor;
  a non-transitory, computer-readable medium embodying thereon a set of computer instructions executable by the computer processor, the set of computer instructions comprising instructions for:
    at a central management server, defining a central repository retention policy;
    defining managed repository retention policies associated with the central repository retention policy, each of the managed repository retention policies having a repository type selected from a plurality of repository types, each of the managed repository retention policies having repository attributes, the defining comprising:
      associating each of the managed repository retention polices with an instance of a repository; and
      mapping values of the repository attributes of each of the managed repository retention policies with attributes of the associated repository instance;
    defining at least one retention policy value of the central repository retention policy; and
    mapping the at least one retention policy value to each of the managed repository retention policies based on the repository type of each of the managed repository retention policies;
  wherein the managed repository retention policies comprise:
    repository type common attributes defining attributes common to the plurality of repository types;
    repository type specific attributes defining attributes specific to each of the repository types;
    phase common attributes defining type phase attributes common to the plurality of repository types; and
    phase specific attributes defining type phase attributes specific to each of the repository types.

8. The system of claim 7, wherein defining at least one retention policy value of the central repository retention policy comprises:
  defining a common phase attribute comprising a phase common attribute or a phase specific attribute; and
  mapping the common phase attribute to at least one of the phase common attributes or at least one of the phase specific attributes of each of the managed repository retention policies.

9. The system of claim 7, wherein the central repository retention policy has master repository attributes inherited by each of the managed repository retention policies and the at least one defined retention policy value is a value of one of the master repository attributes.

10. The system of claim 7, wherein the central management server is coupled to one or more repository servers, the one or more repository servers managing the associated repository instances, the stored instructions further executing:
  updating the central repository retention policy; and
  mapping the update to the associated managed repository retention policies.

11. The system of claim 7, wherein the central repository retention policy is derived from one of the plurality of managed repository retention policies.

12. The system of claim 7, wherein the repository types comprise at least one of: an archival repository type, a cloud-based repository type, or an on-premises enterprise repository type.

13. A computer program product for federated management of repositories comprising a non-transitory, computer-readable medium embodying thereon a set of computer instructions, the set of computer instructions comprising instructions for:
  at a central management server, defining a central repository retention policy;
  defining managed repository retention policies associated with the central repository retention policy, each of the managed repository retention policies having a repository type selected from a plurality of repository types, each of the managed repository retention policies having repository attributes, the defining comprising:
    associating each of the managed repository retention polices with an instance of a repository; and
    mapping values of the repository attributes of each of the managed repository retention policies with attributes of the associated repository instance;
  defining at least one retention policy value of the central repository retention policy; and
  mapping the at least one retention policy value to each of the managed repository retention policies based on the repository type of each of the managed repository retention policies;
  wherein the managed repository retention policies comprise:
    repository type common attributes defining attributes common to the plurality of repository types;
    repository type specific attributes defining attributes specific to each of the repository types;

phase common attributes defining type phase attributes common to the plurality of repository types; and phase specific attributes defining type phase attributes specific to each of the repository types.

14. The computer program product of claim 13, wherein defining at least one retention policy value of the central repository retention policy comprises:

defining a common phase attribute comprising a phase common attribute or a phase specific attribute; and mapping the common phase attribute to at least one of the phase common attributes or at least one of the phase specific attributes of each of the managed repository retention policies.

15. The computer program product of claim 13, wherein the central repository retention policy has master repository attributes inherited by each of the managed repository retention policies and the at least one defined retention policy value is a value of one of the master repository attributes.

16. The computer program product of claim 13, wherein the central management server is coupled to one or more repository servers, the one or more repository servers managing the associated repository instances, the instructions further executing:

updating the central repository retention policy; and mapping the update to the associated managed repository retention policies.

17. The computer program product of claim 13, wherein the central repository retention policy is derived from one of the plurality of managed repository retention policies.

* * * * *